(12) United States Patent
Anzai et al.

(10) Patent No.: US 8,817,363 B2
(45) Date of Patent: Aug. 26, 2014

(54) WAVELENGTH CONVERSION DEVICE AND METHOD OF FABRICATING THE SAME

(75) Inventors: Gakuji Anzai, Nagano (JP); Masafumi Ide, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 0 days.

(21) Appl. No.: 13/391,851

(22) PCT Filed: Aug. 24, 2010

(86) PCT No.: PCT/JP2010/064230
§ 371 (c)(1),
(2), (4) Date: Apr. 13, 2012

(87) PCT Pub. No.: WO2011/024781
PCT Pub. Date: Mar. 3, 2011

(65) Prior Publication Data
US 2012/0195546 A1    Aug. 2, 2012

(30) Foreign Application Priority Data

Aug. 25, 2009 (JP) ................. 2009-194416

(51) Int. Cl.
*G02F 1/377* (2006.01)
(52) U.S. Cl.
USPC ....................... 359/332; 359/326; 385/131
(58) Field of Classification Search
USPC ............. 359/326–332; 372/21–22; 385/14, 385/129–132
See application file for complete search history.

(56) References Cited

U.S. PATENT DOCUMENTS

| 5,652,674 | A | | 7/1997 | Mizuuchi et al. |
| 6,002,515 | A | * | 12/1999 | Mizuuchi et al. ............ 359/326 |
| 7,236,674 | B2 | * | 6/2007 | Mizuuchi et al. ............ 385/130 |
| 7,976,717 | B2 | * | 7/2011 | Li et al. ........................... 216/87 |
| 8,184,360 | B2 | * | 5/2012 | Yoshino ........................ 359/328 |
| 2009/0130476 | A1 | | 5/2009 | Li et al. |

FOREIGN PATENT DOCUMENTS

| EP | 0409104 A2 | 1/1991 |
| JP | 8220578 A | 8/1996 |
| JP | 2007183316 A | 7/2007 |

OTHER PUBLICATIONS

International Search Report and Written Opinion of PCT/JP2010/064230 dated Nov. 2, 2010.
Extended European Search Report issued Jul. 29, 2013 corresponds to EP Patent application No. 10811831.6.

* cited by examiner

*Primary Examiner* — Daniel Petkovsek
(74) *Attorney, Agent, or Firm* — Lowe Hauptman & Ham, LLP

(57) ABSTRACT

A wavelength conversion device includes a base substrate having a transparent electrode on one surface thereof and a ferroelectric single crystal substrate provided with an optical waveguide. The ferroelectric single crystal substrate has an insulating film formed on one surface and is bonded to the base substrate such that the insulating film faces the transparent electrode.

6 Claims, 7 Drawing Sheets

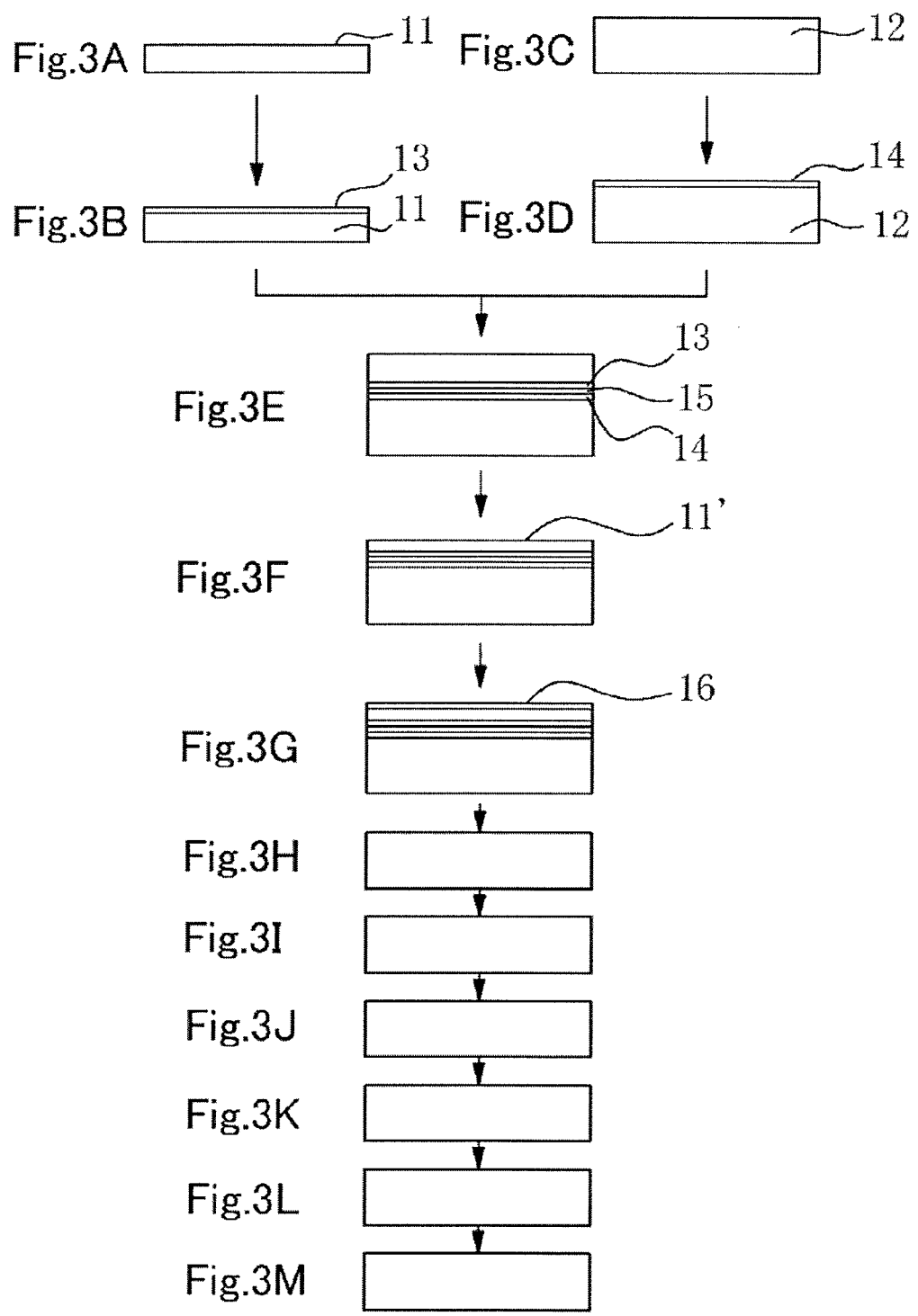

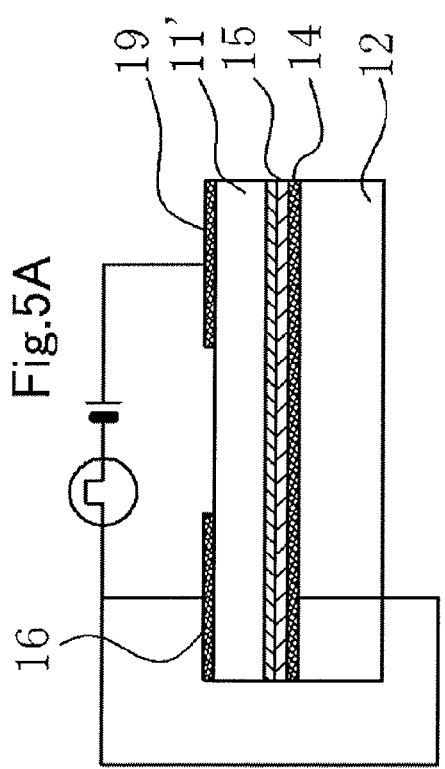
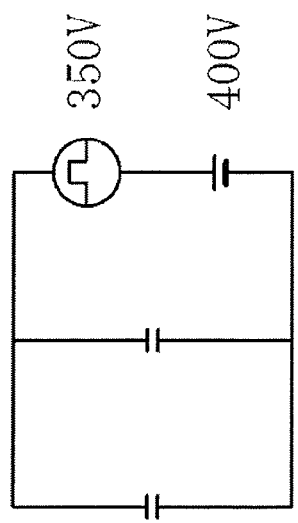
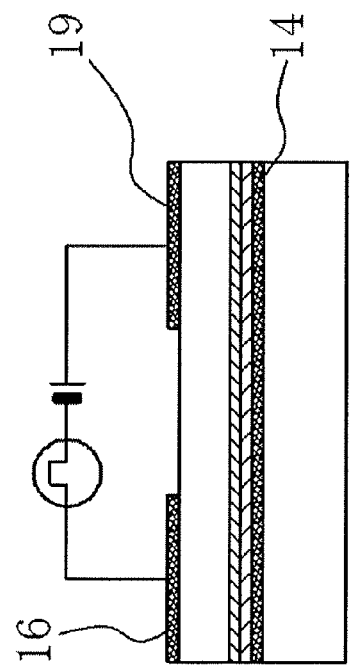
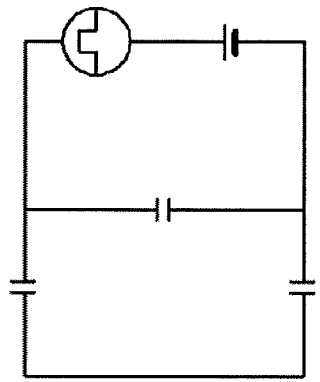

WAVELENGTH CONVERSION DEVICE AND METHOD OF FABRICATING THE SAME

RELATED APPLICATIONS

The present application is a National Phase of International Application Number PCT/JP2010/064230, filed Aug. 24, 2010, and claims priority from, Japanese Application Number 2009-194416, filed Aug. 25, 2009.

TECHNICAL FIELD

The present invention relates to a wavelength conversion device and a method of fabricating the wavelength conversion device.

BACKGROUND ART

Use of the polarization inversion phenomenon, in which the polarization of a ferroelectric is forcibly inverted, forms a periodically poled region (a poled structure) in the ferroelectric. The poled region thus formed are employed in optical frequency modulators that use surface acoustic wave, and optical wavelength conversion devices that use polarization inversion of a nonlinear polarization. This is disclosed in Patent Document 1.

FIG. 1 is a perspective view of a wavelength conversion device disclosed in Patent Document 1 (in which four devices are collectively formed). FIG. 2 is a partial enlarged perspective view of the wavelength conversion device. FIGS. 1 and 2 disclose comb-shaped electrodes 8A and 8B formed on an upper insulating layer 7. The voltage applying electrode 8A includes a rectangular-shaped main body $8A_1$ and a plurality of branch portions $8A_2$. The branch portion $8A_2$ extends from the main body $8A_1$ in the direction −X. The voltage applying electrode 8B includes a plurality of branch portions $8B_2$ that extend from the main body $8B_1$ in the direction +X. The branch portions $8A_2$ and $8B_2$ are mutually engaged. The branch portions $8A_2$ and $8B_2$ are aligned alternately in the direction along the Z axis. The branch portions $8B_2$ alone includes a plurality of narrow branch portions $8B_3$ that extend approximately in the direction −Z (a direction perpendicular to the X axis and along the surface of the substrate) on the surface of the substrate.

Applying voltages $V_1$ and $V_2$ performs the polarization inversion. In view of this, the voltage $V_1$ is set at a DC voltage of 500 V, while the voltage $V_2$ is set at a pulse voltage from 200 to 800 V. Voltages required for the polarization inversion vary depending on an offset angle θ. In the case where the offset angle θ is equal to 5 degrees, the voltages $V_2$ and $V_1$ are both equal to 500 V. After the polarization inversion is carried out, an intermediate of the wavelength conversion device is diced (chip processing). The dicing lines are set between the main bodies $8A_1$ and $8B_1$ and vertical to the X axis.

In order to reduce optical absorption loss caused by an adhesive layer 4, a lower insulating layer 5 is disposed on the lower surface a ferroelectric single crystal substrate 6. The lower insulating layer 5 is made of $SiO_2$ as an under cladding layer that defines a waveguide. The lower insulating film 5 has a refractive index equal to or less than 90% of a refractive index of the ferroelectric single crystal substrate 6. The lower insulating film 5 has a thickness $D_5$ of 0.5 to 1.0 μm. In this example, the lower insulating film 5 of $SiO_2$ is preliminarily formed over a bonding surface of the ferroelectric single crystal substrate 6. The lower insulating film 5 is laminated over a base substrate 2 via the adhesive layer 4.

As electrodes used for the polarization inversion, a metal film 3 is preliminarily formed over the surface to be bonded of the base substrate 2. Material of the metal film 3 is preferably Ta, Al, Ti, Au/Cr, or the like in view of bonding strength with the base substrate 2 and stabilization. The material may be, for example, Au(200 nm)/Cr(50 nm).

In order to decrease in deformation of the base substrate 2 when bonded to the ferroelectric single crystal substrate 6 as much as possible, a difference of thermal expansion coefficients between the base substrate 2 and the ferroelectric single crystal substrate 6 is equal to or less than 5%. That is, the ferroelectric single crystal substrate 6 has a thermal expansion coefficient in each direction of the horizontal surface of a value within the range of 95 to 105% of a thermal expansion coefficient of the base substrate 2 in each direction of the horizontal surface. These thermal expansion coefficients approximately match each other. This reduces substrate delamination and transmission loss increase caused by the difference between the thermal expansion coefficients. A material constituting the ferroelectric single crystal substrate 6 is preferably a single crystal of magnesium-oxide-doped lithium niobate. The substrate is known to have high resistance to optical damage. Therefore, the wavelength of light with high intensity can be converted.

Specifically, the base substrate 2 made of a non-doped LN substrate has a thickness $D_2$ of 0.5 mm. This thickness $D_2$ is preferably equal to or more than 0.1 mm. The base substrate 2 has a parallelism (steps on a surface) of 0.2 μm. This parallelism is preferably equal to or less than 0.3 μm. The MgO-doped ferroelectric single crystal substrate 6 has also a thickness $D_6$ of 0.5 mm. This thickness $D_6$ is preferably equal to or more than 0.1 mm. The MgO-doped ferroelectric single crystal substrate 6 has a parallelism of 0.2 μm. This parallelism is preferably equal to or less than 0.3 μm. To ensure strength of the device and flatness of the device at polishing, it is further preferable that the thicknesses $D_2$ and $D_6$ are both equal to or more than 0.2 mm.

The base substrate 2 and the ferroelectric single crystal substrate 6 have the identical crystal orientation.

In order to reduce the optical absorption loss caused by the adhesive layer 4, an upper insulating film 7 is disposed on the top surface of the ferroelectric single crystal substrate 6. The upper insulating film 7 is made of $SiO_2$ as an over coating layer that constitutes an upper cladding layer of the waveguide. The upper insulating film 7 has a refractive index equal to or less than 90% of the refractive index of the ferroelectric single crystal substrate 6. The upper insulating film 7 has a thickness $D_7$ of 0.2 to 0.5 μm.

A spacing (a cycle) $X_2$ between centers of the narrow branch portions $8B_3$ of the electrode formed on the upper insulating film 7 is equal to a spacing of 6.62 μm between centers of poled regions PR in the direction X. A width $X_1$ of the narrow branch portion $8B_3$ of the electrode formed on the upper insulating film 7 is equal to a width of 0.5 μm of the poled region PR in the direction X. In this case, this device functions as an SHG device of infrared laser light with a wavelength of 1.064 μm. Offset distance $W_3$ in Z-direction between the branch portions $8A_2$ and $8B_2$ of the electrode on the substrate surface is set to 150 μm. These electrodes are fabricated by metal sputtering and subsequent photolithography. The voltage applying electrodes 8A and 8B employ a material of, for example, Au(200 nm)/Cr(50 nm).

The following describes a voltage applying method for the inverting polarization. Spontaneous polarization of the ferroelectric single crystal substrate 6 is aligned in the Z-axis direction of the crystal. Thus a direction of the polarization inversion is the opposite direction of the Z-axis direction.

Therefore, the voltages $V_1$ and $V_2$ are applied such that the electrode 8A is at the positive side, while the electrode 8B and the metal film 3 are at the negative side. This generates an electric field $E_Z$ inside of the material between the electrode 8A and the electrode 8B, and an electric field $E_Y$ inside of the material between the electrode 8A and the metal film 3. When the resultant electric field $E_S$ in the direction $-Z$ is larger than a coercive electric field value of the ferroelectric single crystal, the polarization is inverted.

In short, a pair of the voltage applying electrodes 8A and 8B is formed on the upper insulating layer 7. The Z axis of the ferroelectric single crystal substrate 6 has an angle of θ relative to a direction of the substrate surface. The angle θ is set such that the Z axis is aligned with the direction of the electric field $E_S$ generated inside of the ferroelectric single crystal substrate 6. The electric field $E_S$ is generated by applying the voltage $V_1$ to between the voltage applying electrodes 8A and 8B and applying the voltage $V_2$ to between the metal film 3 and the voltage applying electrode 8A alone. Applying the voltages $V_1$ and $V_2$ generates the polarization inversion in the Z axis of the ferroelectric single crystal substrate 6. Thus the resultant electric field $E_S$ aligned with the Z axis reduces the voltage value required for the polarization inversion.

The above-described ferroelectric single crystal has a coercive electric field value of about 4 to 5 kV/mm. An electric field inside of the material with a lager value than the coercive electric field value is required to generate the polarization inversion. A conventional polarization inversion process applies a voltage to a bulk crystal wafer with a thickness of 0.5 to 1 mm. Therefore, the voltages $V_1$ and $V_2$ of a few to tens of kV have been required.

In the embodiment, the ferroelectric single crystal substrate 6 is laminated on the base substrate 2 and subsequently polished to be thin. The voltage is then applied. Therefore, the internal electric field $E_Z$ in the horizontal direction is approximately the same as before, while the internal electric field $E_Y$ in the vertical direction has become equal to or more than 100 times as large as the conventional one. This increases contribution of the internal electric field $E_Y$ in the vertical direction to the electric field $E_S$ in the direction of the polarization inversion. This results in small voltages in both of the directions. In the embodiment, the ferroelectric single crystal substrate 6 is polished to have a thickness $D_6$ of 5 μm and the polarization inversion was subsequently carried out.

Applying voltages forms a periodically poled structure PPS, which is formed of a plurality of poled regions PR. Use of the wet etching or the like then forms two grooves $GR_1$ and $GR_2$ that extend in the X-axis direction across the plurality of the poled regions PR. This forms what is called a core of ridge-shaped waveguide. This is disclosed in Patent Document 1.

Patent Document 1: JP-A-2007-183316

DISCLOSURE OF THE INVENTION

Problems to be Solved by the Invention

A metal film (for example, Ta) as the electrode 3 for generating the polarization inversion is formed on the surface to be bonded of the base substrate 2. The electrode (the metal film) 3 may be irradiated by laser light with a position of the wavelength conversion device and the incident position of the laser being misaligned, at the time of an inspection of a completed wavelength conversion device or an optical-axis alignment process. The optical-axis alignment process includes aligning the incident position of the laser light with the position of the completed wavelength conversion device at the subsequent assembly process. In this case, the energy of the laser light is absorbed by the metal film, and the absorption consequently increases in temperature of the metal film. This damages the adhesive 4 and causes the thin ferroelectric single crystal substrate 6 to be peeled off. The present invention has been made in view of the above-described circumstances, and it is an object of the present invention to provide a wavelength conversion device that reduces delamination of a substrate even with the misaligned incident position of the laser light and an appropriate method of fabricating the wavelength conversion device.

Solutions to the Problems

A wavelength conversion device according to one aspect of the present invention includes: a base substrate having a transparent electrode on one surface thereof; and a ferroelectric single crystal substrate provided with an optical waveguide, where the ferroelectric single crystal substrate has an insulating film formed on one surface and is bonded to the base substrate such that the insulating film faces the transparent electrode.

The optical waveguide is preferably ridge-shaped.

The transparent electrode preferably includes an ITO film or an InTiO film.

A method of fabricating a wavelength conversion device according to another aspect of the present invention includes: a step of forming a transparent electrode on a base substrate; a step of forming an insulating film on one surface of a ferroelectric single crystal substrate; a bonding step of bonding a transparent-electrode formed surface of the base substrate and an insulating-film formed surface of the ferroelectric single crystal substrate; a polishing step of polishing the other surface of the ferroelectric single crystal substrate so as to thin the ferroelectric single crystal substrate; a step of forming an electrode film on the thinned ferroelectric single crystal substrate; a step of patterning the electrode film into a comb-shaped electrode and a counter electrode for the comb-shaped electrode; and a step of applying a voltage to between the counter electrode and the comb-shaped electrode.

The step of applying preferably includes applying a voltage to the transparent electrode so as to have the same electric potential as an electric potential of the counter electrode.

The transparent electrode preferably includes an ITO film or an InTiO film.

Effects of the Invention

The transparent electrode is formed on the surface to be bonded of the base substrate to generate the polarization inversion. The transparent electrode does not absorb the energy of the laser light even when irradiated by the laser light with the position of the wavelength conversion device and the incident position of the laser being misaligned, at the time of an inspection of a completed wavelength conversion device or an optical-axis alignment process. The optical-axis alignment process includes aligning the incident position of the laser light with the position of the completed wavelength conversion device at the subsequent assembly process. This prevents a temperature increase and peeling off of the ferroelectric single crystal substrate as in the case of using a metal electrode. Among the transparent electrodes, an ITO film and an InTiO film have high transparency and high conductive property, which leads to a preferred result. Employing the transparent electrode allows to view a surface, which is bonded to a polishing substrate, of the base substrate while grinding and polishing. Thus, an existence of air bubbles can be determined. When peeling off the base substrate from the polishing substrate after polishing, the base substrate may be peeled off while verifying a condition of delamination. This improves work efficiency. In the case where the transparent electrode is an oxide transparent electrode, an adhesive strength between the transparent electrode and the ferroelectric single crystal substrate is far more than that of a metal electrode. This also reduces delamination between the base substrate and the ferroelectric single crystal substrate at an ultrasonic cleaning after the chip processing. Further, the increased adhesive strength also improves heat resistance. Objects, characteristics, situations, and advantageous effects of the present invention will be clarified by referring to the description and the accompanying drawings below.

BRIEF DESCRIPTION OF THE DRAWINGS

FIG. 3A to FIG. 3M are schematic diagrams illustrating a fabricating process of a wavelength conversion device according to an embodiment of the present invention.

FIG. 5A and FIG. 5C are schematic diagrams illustrating the wavelength conversion device according to the embodiment of the present invention when voltages are applied for the polarization inversion, and FIG. 5B and FIG. 5D are respective equivalent circuit diagrams of FIG. 5A and FIG. 5C.

DESCRIPTION OF EMBODIMENTS

Figure 4A:
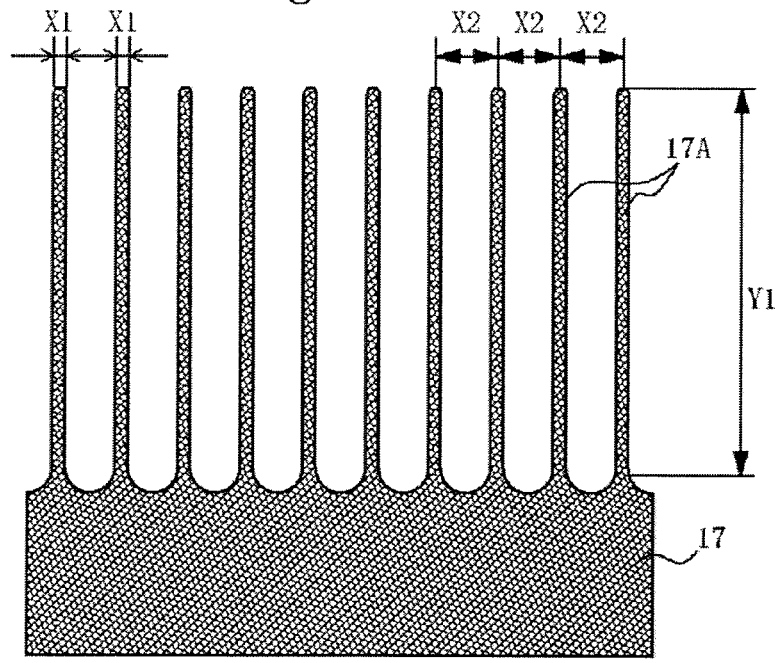
FIG. 4A and FIG. 4B are top views of a comb-shaped electrode of the wavelength conversion device according to the embodiment of the present invention.
Figure 4B:
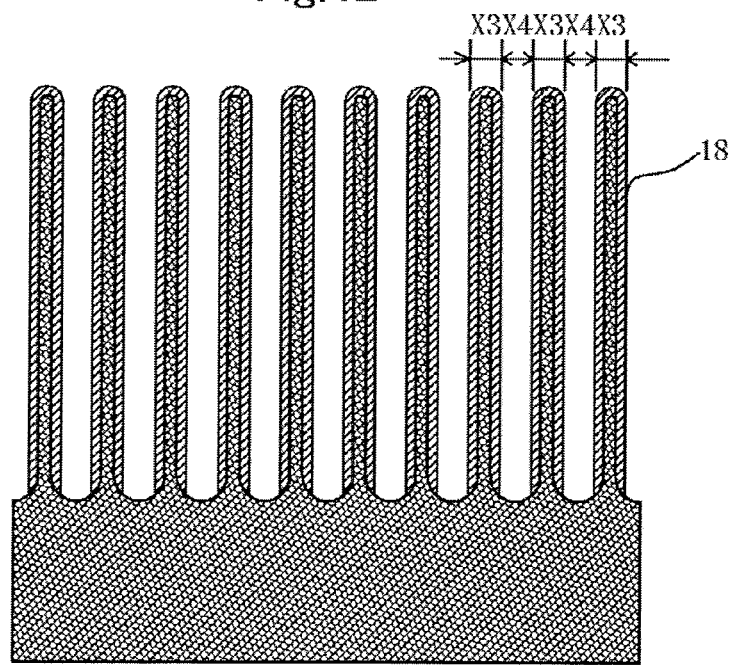
Figure 6:
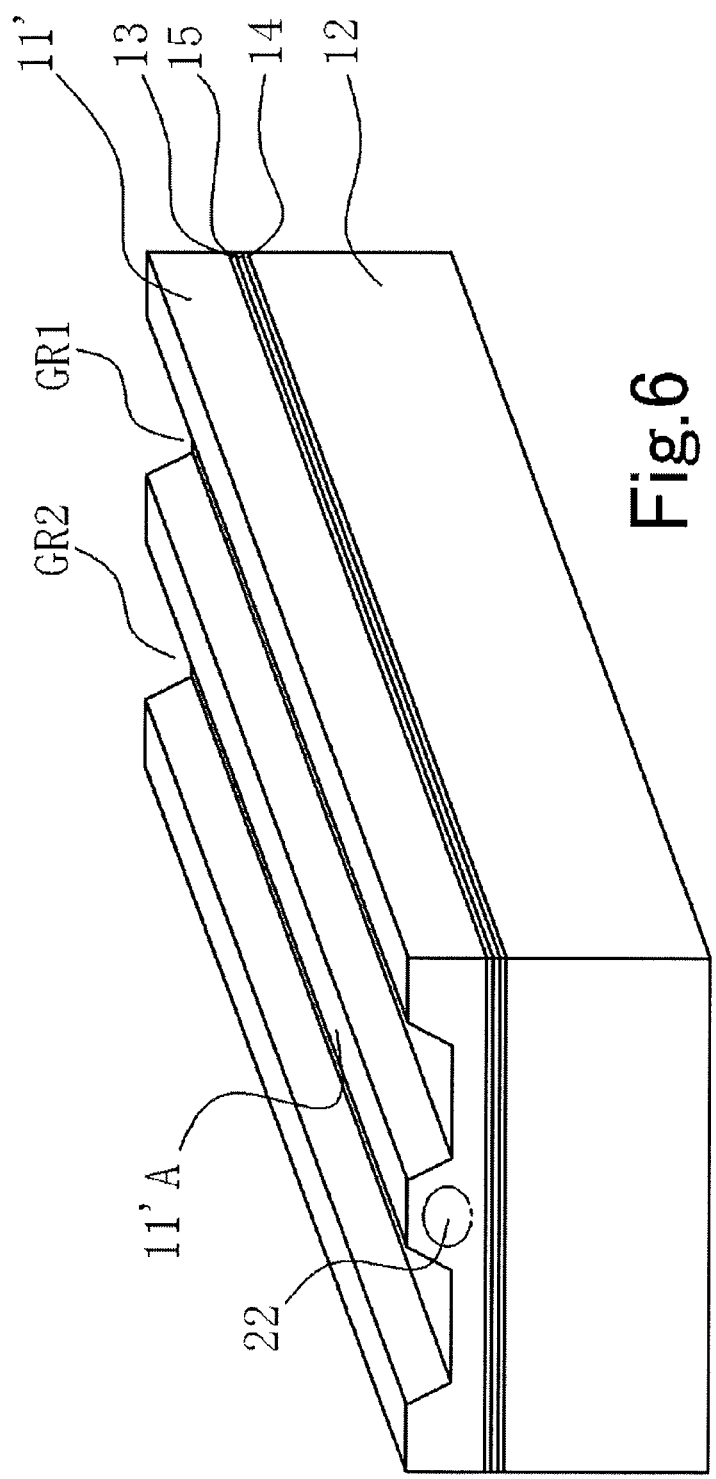
FIG. 6 is a perspective view of the wavelength conversion device according to the embodiment of the present invention.
Figure 7A:
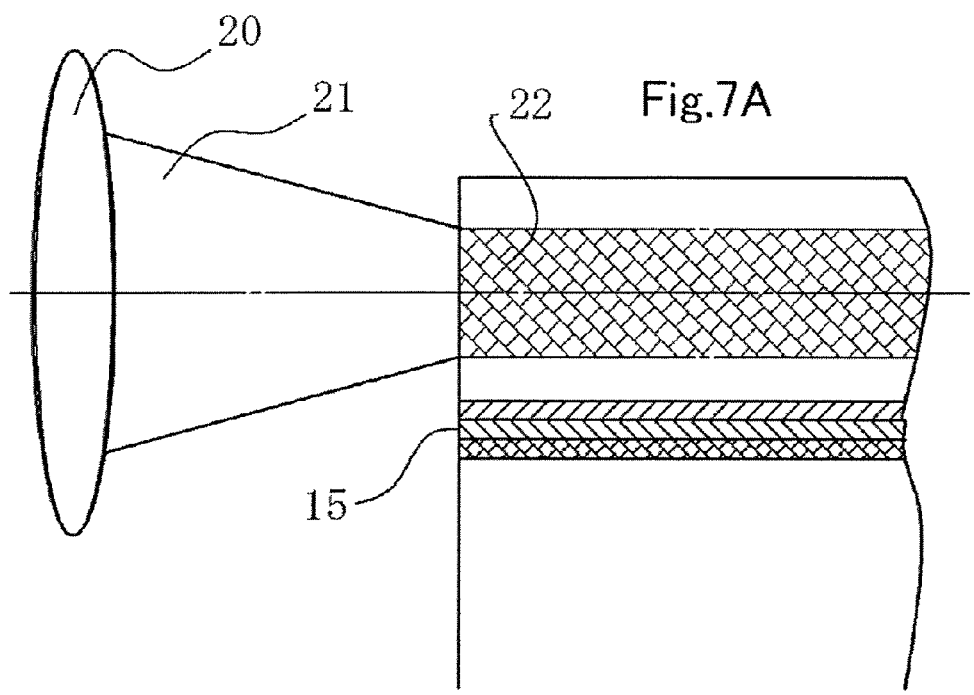
FIG. 7A and FIG. 7B are schematic diagrams illustrating laser lights entering into the wavelength conversion device according to the embodiment of the present invention.
Figure 7B:
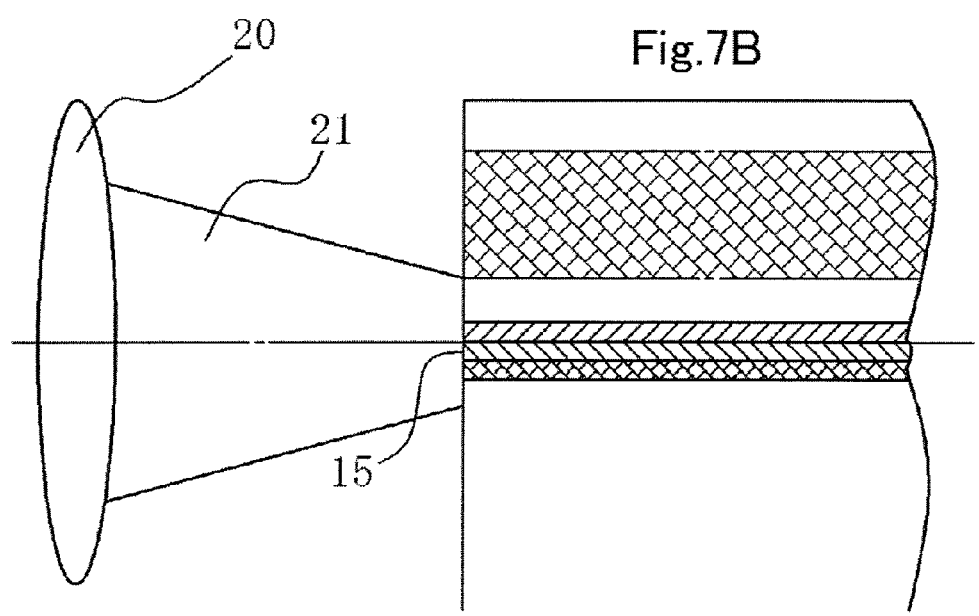

FIG. 3A to FIG. 3M are schematic block diagrams illustrating a fabricating process of the wavelength conversion device according to an embodiment of the present invention. FIG. 4A and FIG. 4B are top views of comb-shaped electrodes. FIG. 5A and FIG. 5C are schematic diagrams illustrating voltage application states at the time of the polarization inversion. FIG. 5B and FIG. 5D are respective equivalent circuit diagrams of FIG. 5A and FIG. 5C. FIG. 6 is a perspective view of the wavelength conversion devices. FIG. 7A and FIG. 7B are schematic diagrams illustrating lights entering into the wavelength conversion device.

FIG. 3A to FIG. 3M are process charts in side views illustrating a method of fabricating the wavelength conversion device according to the embodiment of the present invention. In the step illustrated in FIG. 3A, a ferroelectric single crystal substrate 11 with a thickness of 0.5 mm (for example, a 5° off y-cut substrate of MgO-doped $LiNbO_3$) is prepared. In the step illustrated in FIG. 3B, an insulating film 13 on a surface of the ferroelectric single crystal substrate 11 is formed. The insulating film 13 is, for example, a deposited $SiO_2$ with a thickness of 0.1 to 1.0 μm (preferably 0.5 μm).

In the step illustrated in FIG. 3C, a base substrate 12 is prepared. The base substrate 12 is selected out of substrates with thermal expansion coefficients similar to that of the ferroelectric single crystal substrate 11 (for example, a y-cut substrate of $LiNbO_3$). The thickness of the base substrate 12 is set to 1 mm. In the step illustrated in FIG. 3D, a transparent electrode 14 is formed on a surface of the base substrate 12. The transparent electrode 14 is a transparent conductive film. Material of the transparent electrode 14 is, for example, ITO, InTiO, ZnO, AZO, or GZO. The transparent electrode 14 is preferably an ITO film or an InTiO film that each have high transparency and high conductive property. The transparent electrode 14 is formed by deposition, ion plating, or sputtering method so as to have a thickness of, for example, 0.02 to 1.0 μm (preferably 0.05 μm). The InTiO film is a Ti-doped indium oxide film. The ITO film is applicable to an SHG wavelength conversion device that converts a near-infrared light with a longer wavelength than 1.2 μm (for example, the light with a wavelength of 1.26 μm) into a light with a wavelength of 0.63 μm. On the other hand, the InTiO film is especially preferable because the InTiO film may have high transmittance and low absorbance with respect to a long wavelength light, compared to the ITO film while keeping a similar conductive property to the ITO film. The reason is as follows. That is, a mobility μ of an electron as a carrier of an n-type degenerate semiconductor of the InTiO film is larger than that of the ITO film. Therefore, use of Formula (1) that expresses the relationship between the electrical conductivity σ and the mobility μ shows a possibility of a relatively lower carrier concentration n.

$$\sigma = ne\mu \qquad \text{Formula (1)},$$

where e denotes the charge of an electron. Reflection and absorption characteristics of the transparent conductive film in the near-infrared region is determined by plasma oscillation of carrier electrons in the conductive film. A plasma frequency ωp is defined by Formula (2).

$$\omega_P^2 = ne^2/\epsilon m^* \qquad \text{Formula (2)}$$

In Formula (2), ϵ denotes the permittivity, and m* denotes the effective mass of the carrier (electrons in this case). As Formula (2) shows, the plasma frequency is determined by the carrier concentration n (in this case, an electron concentration). Therefore, InTiO, which allows the lower carrier concentration, may have the lower plasma frequency (that is, a wavelength λp corresponding to the plasma frequency can be shifted to a long wavelength side). This allows InTiO to have further lower reflection and absorption in the near-infrared region, compared to ITO.

In the step illustrated in FIG. 3E, the ferroelectric single crystal substrate 11 and the base substrate 12 are bonded together via an adhesive layer 15. The adhesion is carried out in the state where the insulating film 13 and the transparent electrode 14 face one another that are formed on the ferroelectric single crystal substrate 11 and the base substrate 12, respectively. The adhesive layer 15 is, for example, a polyimide adhesive. The adhesive layer has a thickness of, for example, 0.2 to 1.0 μm (preferably 0.5 μm).

Next, the base substrate 12 is bonded to a polishing substrate (not shown). Then, the ferroelectric single crystal substrate 11 is processed by grinding and polishing (FIG. 3F). The thinned ferroelectric single crystal substrate 11' has a thickness of, for example 2.5 to 5.0 μm. This thickness is appropriately determined depending on usage.

In the step illustrated in FIG. 3G, a comb-shaped electrode 16 for polarization inversion is formed on a surface of the thinned ferroelectric single crystal substrate 11'. For example, a uniform deposition of Ta with a thickness of 0.01 to 2.0 μm (preferably 0.1 μm) on the surface of the ferroelectric single crystal substrate 11' forms a film for mask. The mask is formed such that a desired comb-shaped electrode for polarization inversion can be formed. An etching is then processed.

The step illustrated in FIG. 3H is a comb-shaped electrode forming process. FIG. 4A is a plan view of the comb-shaped electrode, and FIG. 4B is a plan view illustrating poled regions after the polarization. The comb-shaped electrode main body 17 includes a plurality of comb-shaped electrode branch portions 17A. Dimensions of a width X1 of a comb-shaped electrode branch portion, a length Y1 of the comb-shaped electrode branch portion, and a distance X2 between the comb-shaped electrode branch portions 17A are appropriately determined corresponding to a desired polarization inversion shape and phase matching condition. A width X3 of a poled region 18 is larger than the width X1 of the comb-shaped electrode branch portion. A condition of polarization inversion is set such that the width X3 of the poled region and a width X4 between poled regions are identical.

The step illustrated in FIG. 3I is a periodic polarization inverting process. FIG. 5A and FIG. 5C are schematic diagrams illustrating the voltage application states at the time of the periodic polarization inversion. FIG. 5B and FIG. 5D are respective equivalent circuit diagrams of FIG. 5A and FIG. 5C. The reference numerals 19, 16, and 14 respectively denote the comb-shaped electrode, a counter electrode, the transparent electrode. In FIG. 5A, the counter electrode 16 and the transparent electrode 14 are coupled to the negative side of a DC power of 250 to 600 V. The comb-shaped electrode 19 is coupled to the positive side of this DC power. The pulse voltage of 100 to 500 V is applied to respective electrodes. In FIG. 5C, the counter electrode 16 is coupled to the negative side of the DC power of 250 to 600 V. The comb-shaped electrode 19 is coupled to the positive side of the DC power. The pulse voltage of 100 to 500 V is applied to the respective electrodes. No voltage is applied to the transparent electrode 14. Applying voltages in the states illustrated in FIG. 5A or FIG. 5C provides a periodically poled structure.

The step illustrated in FIG. 3J is a process for removing the applying comb-shaped electrode 19 and the counter electrode 16.

Figure 2:
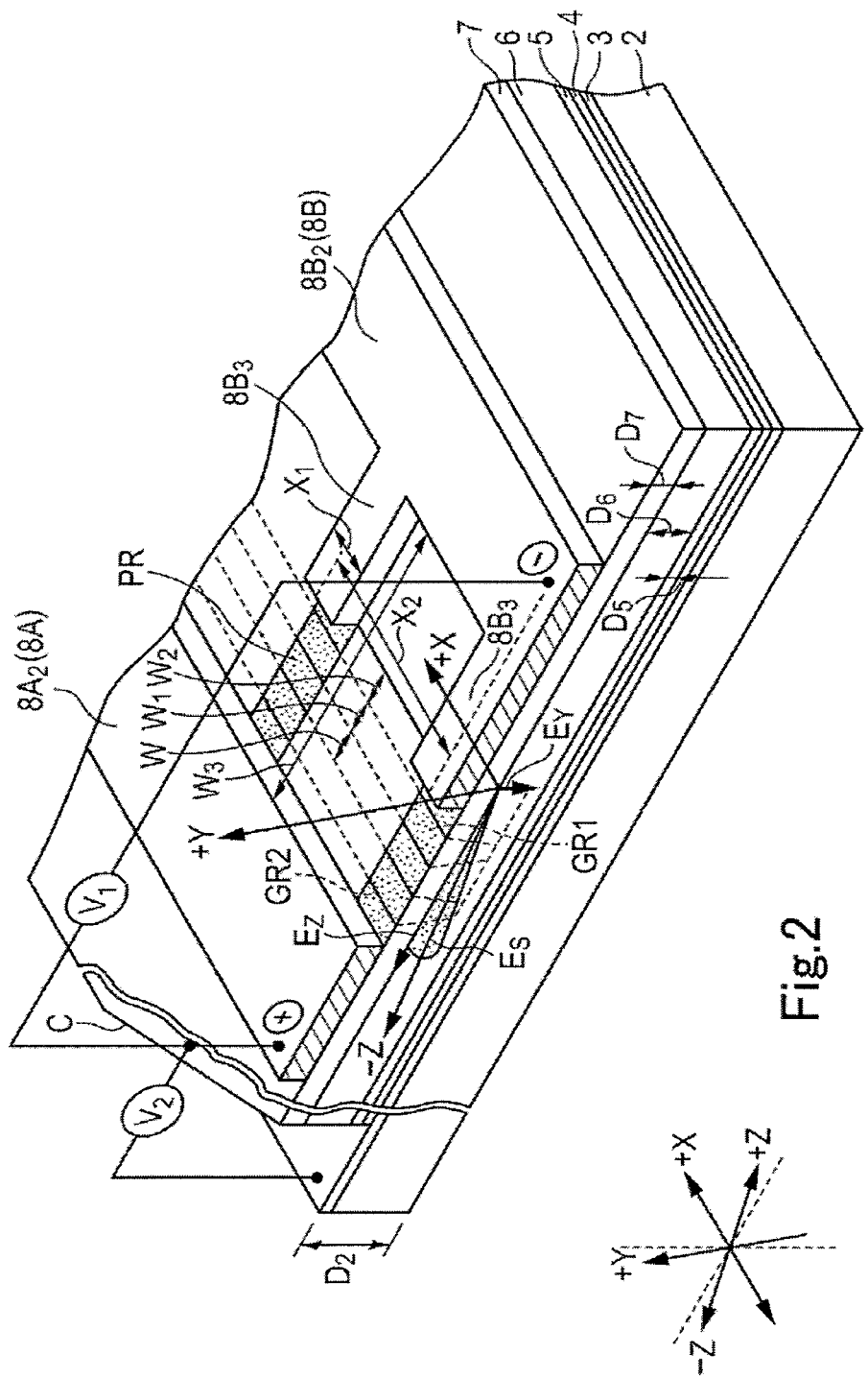
FIG. 2 is a partial enlarged perspective view of the conventional wavelength conversion device.

The step illustrated in FIG. 3K is a ridge forming process. In this step, the grooves $GR_1$ and $GR_2$ illustrated in FIG. 2 are formed by dry etching, dicing, or laser processing. FIG. 6 is a perspective view of a completed wavelength conversion device. The grooves illustrated in this drawing are formed.

Figure 1:
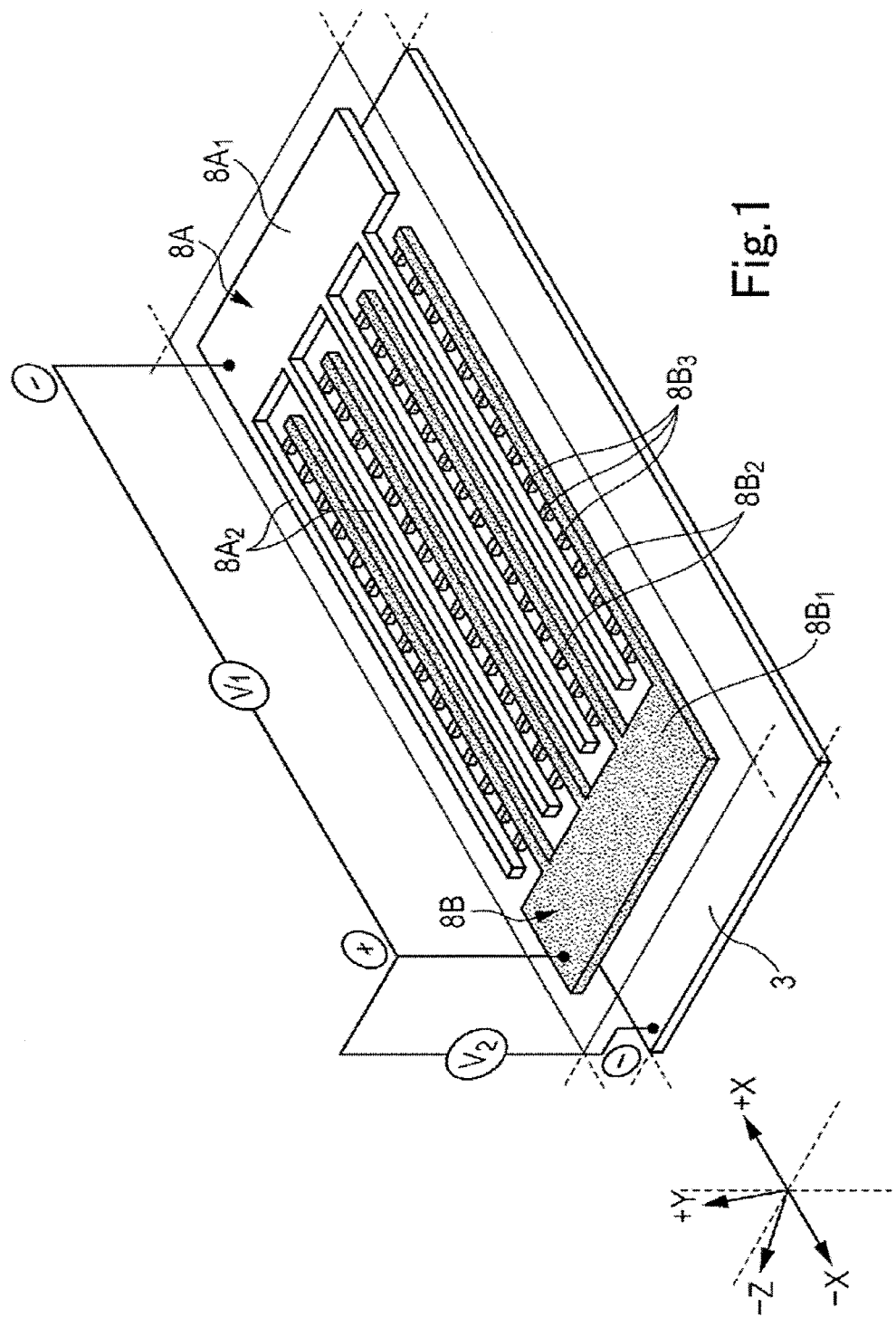
FIG. 1 is a perspective view of a conventional wavelength conversion device (in which four devices are collectively formed).

The step illustrated in FIG. 3L is an end surface polishing process. In this step, the comb-shaped electrode main bodies of a chip, which includes four devices as illustrated in FIG. 1, are cut and removed. The entering end face and the outgoing end face of laser light are then polished.

The step illustrated in FIG. 3M is an individual-dividing process. The process divides a chip including four devices into an individual device illustrated in FIG. 6.

FIG. 7A and FIG. 7B are schematic diagrams illustrating laser lights entering into the wavelength conversion device. FIG. 7A shows an example of a state where a laser beam 21 and an incident position 22 of the laser beam are aligned. FIG. 7B shows an example of a state where the laser beam 21 and the incident position 22 of the laser beam are misaligned.

This application is based on Japanese Patent Application No. 2009-194416 filed on Aug. 25, 2009 in Japan by the applicants of this application, the disclosures of which are incorporated herein by reference in their entirety. Additionally, the disclosures of JP-A-2007-183316 recited as the background art are also incorporated herein by reference in their entirety.

The above description of specific embodiments of the present invention is disclosed as illustrative. This does not intend to be exhaustive or limit the present invention to the described embodiments as they are. Many modifications and variations will be apparent to one of ordinary skill in the art in light of the above teachings.

DESCRIPTION OF REFERENCE SIGNS

2 Base substrate
3 Metal film
4 Adhesive layer
5 Lower insulating film
6 Ferroelectric single crystal substrate
7 Upper insulating film
8A Comb-shaped electrode
$8A_1$ Main body
$8A_2$ Branch portions
8B Comb-shaped electrode
$8B_1$ Main body
$8B_2$ Branch portions
$8B_3$ Narrow branch portions
11 Ferroelectric single crystal substrate
11' Thinned ferroelectric single crystal substrate
11'A Ridge
12 Base substrate
13 Insulating film
14 Transparent electrode
15 Adhesive layer
16 Counter electrode
17 Comb-shaped electrode main body
17A Comb-shaped electrode branch portion
18 Poled region
19 Comb-shaped electrode
20 Lens
21 Laser beam
22 Incident position of laser beam
PR Poled region
$E_S$ Resultant electric field in a direction −Z
$E_Y$ Internal electric field in a vertical direction
$E_Z$ Internal electric field in a horizontal direction
PPS Periodically poled structure
$GR_1$ Groove
$GR_2$ Groove

The invention claimed is:

1. A method of fabricating a wavelength conversion device comprising:
   a base substrate having a transparent electrode directly on one surface thereof; and
   a ferroelectric single crystal substrate provided with an optical waveguide, having an insulating film formed on one surface, and bonded to the base substrate such that the insulating film faces the transparent electrode,
   the method comprising:
   a step of forming the transparent electrode on the base substrate;
   a step of forming the insulating film on one surface of the ferroelectric single crystal substrate;
   a bonding step of bonding a transparent-electrode formed surface of the base substrate and an insulating-film formed surface of the ferroelectric single crystal substrate;
   a polishing step of polishing the other surface of the ferroelectric single crystal substrate so as to thin the ferroelectric single crystal substrate;
   a step of forming an electrode film on the thinned ferroelectric single crystal substrate;

a step of patterning the electrode film into a comb-shaped electrode and a counter electrode for the comb-shaped electrode; and a step of applying a voltage to between the counter electrode and the comb-shaped electrode of the thinned ferroelectric single crystal substrate and to the base substrate in the horizontal direction, wherein the step of applying a voltage includes applying a bias voltage of DC 250 to 600 V and a pulse voltage of 100 to 500 V to between the counter electrode and the comb-shaped electrode.

2. The method of fabricating the wavelength conversion device according to claim 1, wherein the optical waveguide is ridge-shaped.

3. The method of fabricating the wavelength conversion device according to claim 1, wherein the step of applying a voltage includes applying a voltage to the transparent electrode so as to have the same electric potential as an electric potential of the counter electrode.

4. The method of fabricating the wavelength conversion device according to claim 1, wherein the transparent electrode includes an indium tin oxide film or an InTiO film.

5. The method of fabricating the wavelength conversion device of claim 1 wherein the ferroelectric single crystal substrate has a thickness of 2.5 to 5.0 μm.

6. The method of fabricating the wavelength conversion device according to claim 1, wherein the bonding step includes bonding the transparent-electrode formed surface of the base substrate and the insulating-film formed surface of the ferroelectric single crystal substrate via an adhesive layer.

* * * * *